United States Patent [19]

Weseloh et al.

[11] 3,923,287
[45] Dec. 2, 1975

[54] HAND BRAKE FOR RAILROAD CARS

[75] Inventors: Roger J. Weseloh, Glenwood; Wajih Kanjo, Midlothian, both of Ill.

[73] Assignee: Universal Railway Devices Company, Chicago, Ill.

[22] Filed: Nov. 6, 1974

[21] Appl. No.: 521,339

[52] U.S. Cl. ................ 254/150 R; 74/505; 192/16
[51] Int. Cl.[2] .......................................... G05G 1/08
[58] Field of Search ............... 254/150 R, 8; 192/16; 74/505, 789, 805, 337

[56] References Cited
UNITED STATES PATENTS

| | | | |
|---|---|---|---|
| 3,027,985 | 4/1962 | Klasing | 196/16 |
| 3,390,590 | 7/1968 | Natschke et al. | 74/505 |
| 3,625,086 | 12/1971 | Natschke | 74/505 |
| 3,668,944 | 6/1972 | Natschke | 74/505 |

*Primary Examiner*—Leo Friaglia
*Assistant Examiner*—R. Schrecengost
*Attorney, Agent, or Firm*—Mann, Brown, McWilliams & Bradway

[57] ABSTRACT

A hand brake for railroad cars comprising a housing including a front casing and a rear or back plate, between which an operating shaft is journaled (that bears the usual vertical hand wheel), and within which is mounted the brake drum and a release wheel in concentric relation to the operating shaft. A ratchet mechanism permits winding of the brake chain in one direction only, with a clutch device releasably coupling the operating shaft to the ratchet mechanism, and the winding of the drum being through a non-rotating but gyrating pinion that meshes with a ring gear that is part of the drum, with the pinion being actuated through an eccentric sleeve mounted on the operating shaft that is to be rotated with the shaft to cam the pinion and thereby provide its gyrating motion. The eccentric sleeve is threadedly connected to the shaft and includes a clutch collar that is part of the clutch device, with the threading having a hand such that under the tension in the brake chain, the clutch device is in clutching relation with the ratchet mechanism for wind up purposes, but on operation of the shaft for controlled release of the brake, the clutch device loosens sufficiently for brake chain let out under the control of the operator. The release wheel is in the form of a spider that is concentric with the shaft, and with which a brake release mechanism is associated to fix the release wheel against movement for chain winding, and to which the pinion is operably connected to provide a purchase against which the pinion acts in serving to turn the winding drum. For quick release of the brake, the release mechanism is actuated to release the release wheel which then turns with the brake drum as the chain is released.

14 Claims, 8 Drawing Figures

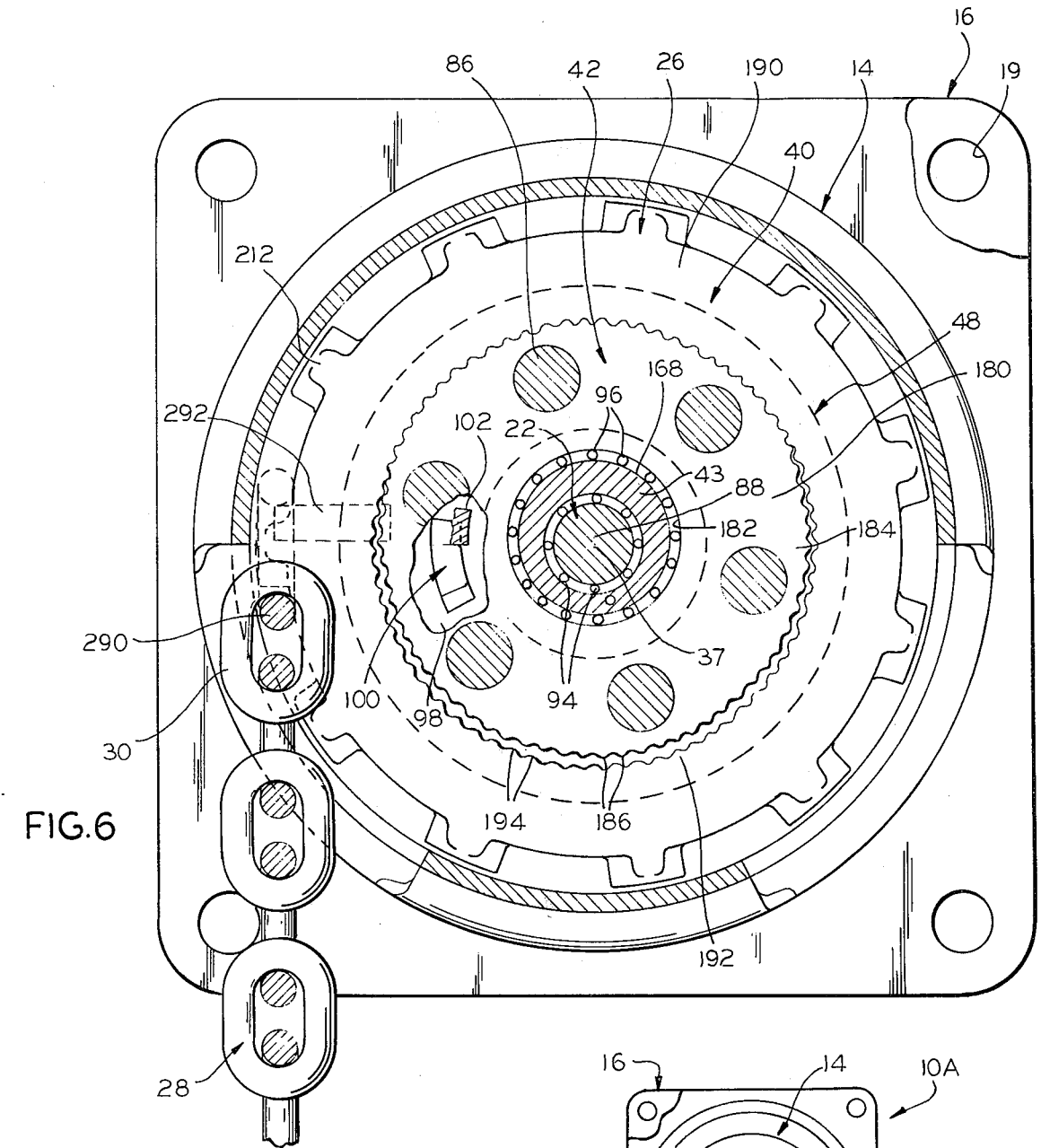
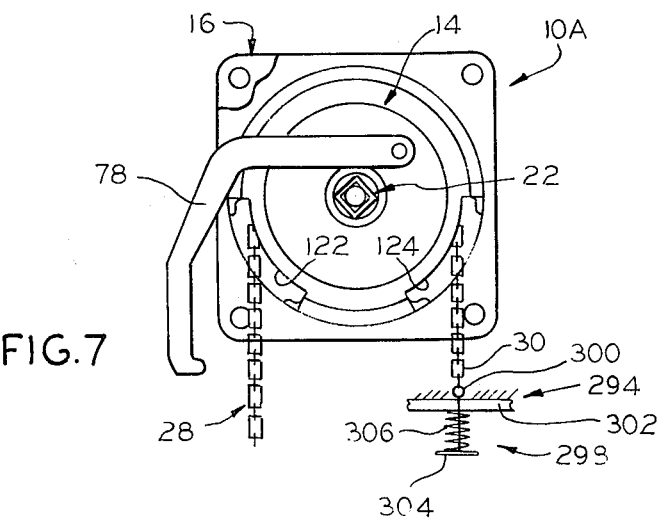
FIG.6
FIG.7

HAND BRAKE FOR RAILROAD CARS

This invention relates to a hand brake for railroad cars, and more particularly, to improvements in the hand brake arrangements shown in U.S. Pats. Nos. 2,848,083, 3,390,590, and 3,625,086.

The hand brake arrangements of said patents are concerned with non-spin vertical hand wheel type hand brake mechanisms for manually setting the brakes of a railroad car, in which controlled or full release actions are provided for.

A principal object of this invention is to generally improve such hand brake arrangements, and in particular, to provide a high power hand brake arrangement of a compact nature that is adapted for both limited and continuous wind applications.

Another principal object of the invention is to arrange the hand brakes so that the chain winding drum is concentric with the hand brake operating shaft and is rotated relative thereto for chain winding purposes through gearing that operates about the operating shaft in association with the ratchet and clutch mechanisms that are similarly oriented for minimizing the brake unit size.

Yet another important object of the invention is to arrange the hand brake so that not only are limited or continuous wind applications provided for, but a particular hand brake unit may be optionally arranged for either full or partial power, with chain movement in either direction about the brake operating shaft, by selecting gear tooth combinations in gearing that is fully interchangeable within the basic hand brake unit.

Other objects of the invention are to simplify brake mechanisms of the type indicated, to provide a ring gear type winding mechanism therefor, and to provide a hand brake arrangement that is economical of manufacture, convenient to install and use, and long lived and reliable in operation.

In accordance with this invention, the hand brake arrangement comprises a housing including a front casing and a rear or back plate between which the operating shaft is journaled, and within which is mounted the brake drum and an energy absorbing release wheel in concentric relation to the operating shaft. A ratchet mechanism permits winding of the brake chain in one direction only, with a clutch device of the friction type coupling the operating shaft to the ratchet mechanism. For winding of the drum, a ring gear type gearing mechanism is provided in which a non-rotating but gyrating pinion is provided that meshes with a ring gear that is part of the drum, with the pinion being actuated through an eccentric sleeve mounted on the operating shaft to be rotated by the shaft on hand operation of the shaft to set the car brakes. The pinion actuating eccentric sleeve is threadedly connected to the shaft for camming engagement with the pinion; the eccentric sleeve and shaft are provided with clutch collars that are part of the clutch device, and that frictionally engage a ratchet wheel of the ratchet mechanism, with the threading of the shaft and eccentric sleeve having a hand such that under tension in the brake chain, the clutch device is operative to clutch the ratchet wheel for chain wind up purposes, but on operation of the shaft for controlled release of the brake, the clutch device loosens sufficiently for brake chain let out under the control of the operator.

The energy absorbing release wheel is in the form of a spider that is concentric with the shaft, and with which a brake release mechanism is associated to fix the release wheel against movement for chain winding purposes, and to which the pinion is operatively connected to provide a purchase against which the pinion acts in cooperating with the drum ring gear to turn the winding drum. For quick release of the brake, the brake release mechanism is actuated by an external release handle to effect release of the release wheel which then turns with the brake drum as the chain is released. The arrangement is such that, on quick release, the winding drum is in effect disconnected from the ratchet mechanism for rotational movement independent of the operating shaft, along with the release wheel.

Other objects, uses, and advantages will be obvious or become apparent from a consideration of the following detailed description and the application drawings, in which like reference numerals indicate like parts throughout the several views.

In the drawings:

FIG. 2A is a fragmental sectional view radially of the device brake drum showing a stop flange thereof and its cooperation with the back plate mounted stop lug;

FIG. 6 is a vertical sectional view taken substantially along line 6—6 of FIG. 2; and FIG. 7 is a view similar to that of FIG. 1, but on a reduced scale, illustrating the device arranged for continuous wind.

However, it is to be understood that the specific drawing illustrations provided are supplied primarily to comply with the requirements of the Patent Laws, and that the invention is susceptible of variations and alternate embodiments which will be obvious to those skilled in the art, and which are intended to be covered by the appended claims.

GENERAL DESCRIPTION

Figure 1:
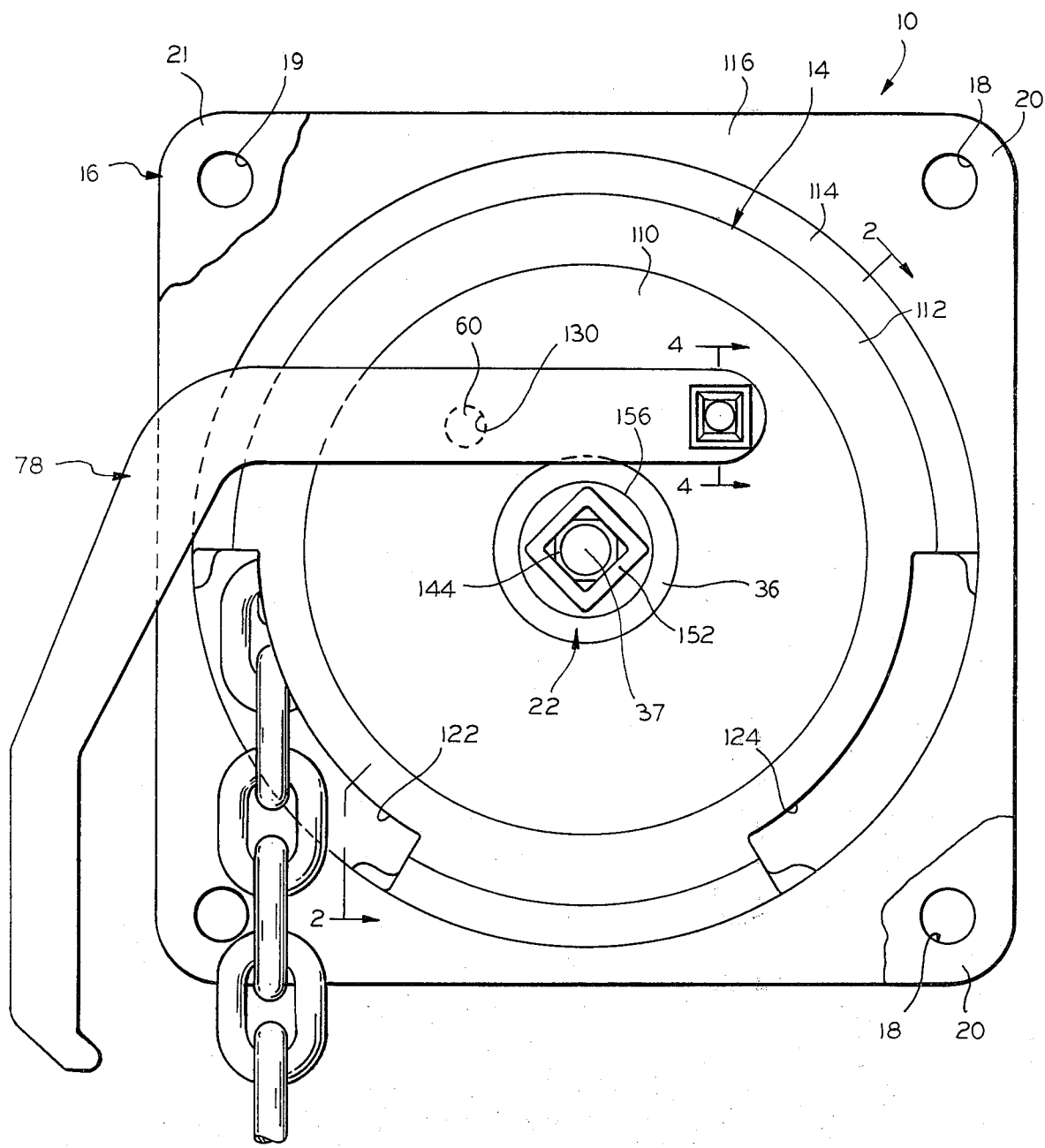
FIG. 1 is a front elevational view of an embodiment of the improved hand brake arranged for limited wind, with the usual vertical hand wheel omitted for clarity of illustration.
Figure 2:
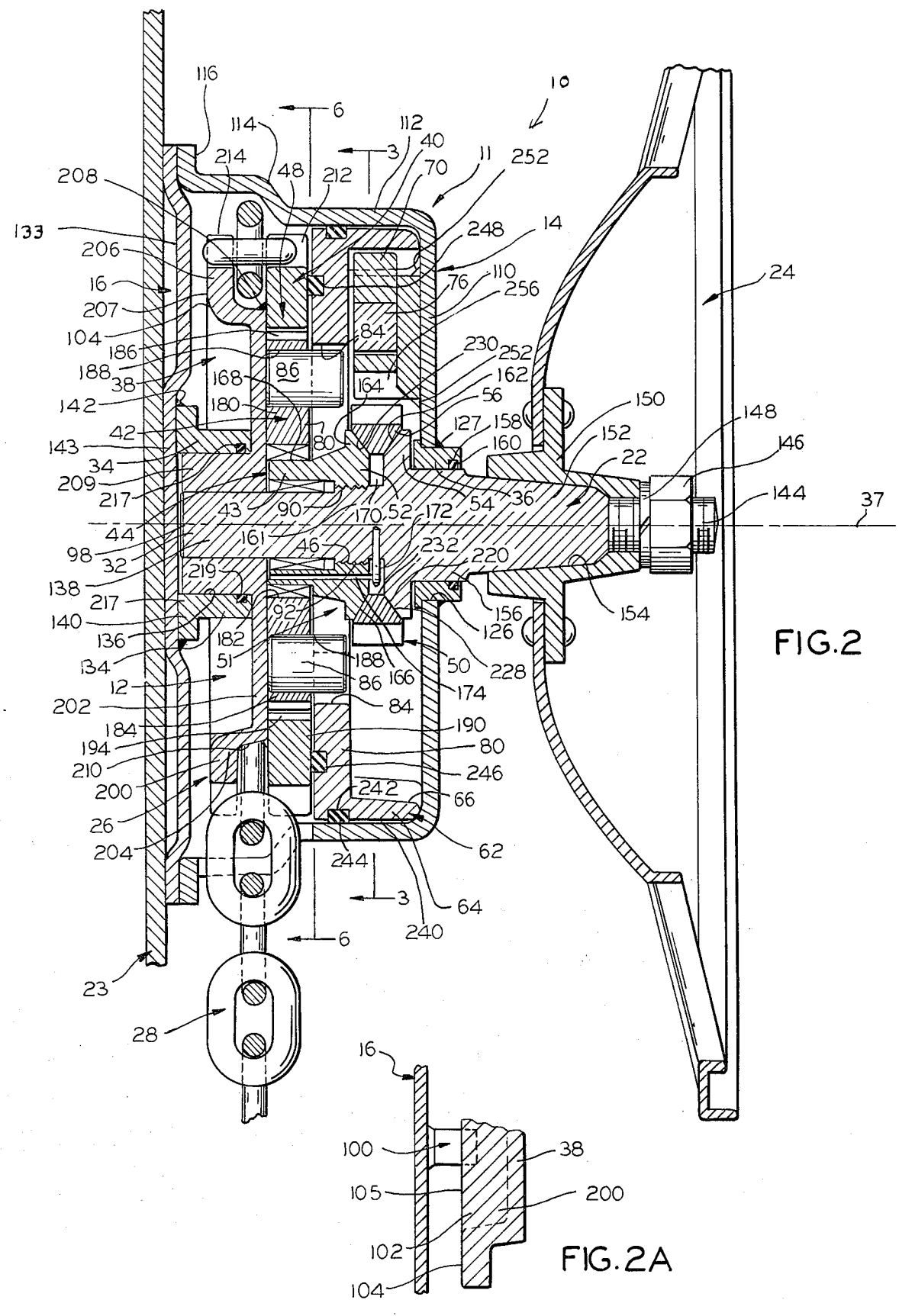
FIG. 2 is a diagrammatic sectional view of the hand brake taken substantially along line 2—2 of FIG. 1.

Reference numeral 10 of FIGS. 1 and 2 generally indicates one embodiment of the invention, arranged for limited wind, and positioned as it would be applied to a railroad car, in which the brake operating mechanism is indicated at 12 and is contained in housing 11.

The housing 11 is in the form of two sections comprising a front casing 14 and a back section or rear plate 16 of generally quadrilateral configuration defining bolt receiving openings 18 and 19 at their respective corners 20 and 21 adapted to receive suitable bolts (not shown) for securing the hand brake housing together and to a suitable mounting plate 23 arranged for suitably securing the brake 10 in its operating position on the car, in which position the hand brake 10 is positioned substantially as shown in FIGS. 1 and 2, with the attaching plate 16 vertically disposed.

The operating mechanism of the hand brake 10 generally comprises an operating shaft 22 that is journaled between the front casing 14 and back plate 16 and has suitably keyed thereto the familiar vertical hand wheel 24 that the operator employs to apply the car brakes (and which is omitted from the showing of FIG. 1).

Operably associated with the operating shaft 22 is the winding drum 26, to which brake chain 28 has one end 30 of same suitably secured (in the form of FIGS. 1–7) for winding up on the brake drum 26 utilizing the operating shaft 22.

In the form shown, the operating shaft 22 is journaled at its inner end 32 in a rear bearing sleeve 34 suitably secured to the back plate 16, and at the front casing 14, shaft 22 is journaled in front bearing sleeve 36 that is suitably secured to the front casing 14.

The drum 26 is journaled within sleeve 34 and on shaft 22, within the housing 11, for rotational movement about the axis of rotation of the shaft 22, indicated at 37.

The winding drum 26 generally comprises a rear main or base plate 38 to which is affixed a ring gear 40 that is concentric with the axis 37 of shaft 22 and is in meshing engagement with a pinion 42 that is eccentrically disposed relative to the operating shaft axis 37 and that is journaled on an eccentric portion 43 of a collar 44 mounted on shaft 22 and having a threaded connection thereto as at 46.

The ring gear 40 and pinion 42 comprise a gear mechanism 48 that is operated by the operating shaft 22 to provide the mechanical advantage desired in winding up the brake chain 28.

Operably associated with the operating shaft 22 is ratchet mechanism 50 which cooperates with the shaft 22 through a clutch device 51 (see FIG. 2). The clutch device 51 comprises a clutch collar portion 52 of the collar 43 and a cooperating clutch collar portion 54 of the shaft 22 that frictionally engage ratchet wheel 56 of the ratchet device 50. The movement of the ratchet wheel 56 is controlled by pawl 58 that is of the double ended silent type, and is suitably journaled on the front casing 14 as by employing suitable pin 60.

Also journaled within the front casing 14 is release wheel 62 that is in the form of the spider 64 and is mounted to be concentric with the axis 37 of shaft 22 and defines a rim wall 66 that is shaped internally to define equally spaced notches or indentations 68 which are adapted to receive a pawl 70 of brake release mechanism 72 which also includes a brake release shaft 74 suitably journaled on front casing 14 and having an actuating arm or lever 76 keyed thereto and pivotally connected to pawl 70 for actuating same to move generally radially of shaft 22 between lock and release positions. Shaft 74 is suitably connected to bottom release lever 78 which the brake operator actuates to give the brake quick release.

The spider 64 also defines a radial flange 80 that is annular in nature and thus defines a cylindrical bore forming surface 82 that is concentric with the operating shaft axis 37, and in the form shown, the flange 80 is also formed with a plurality of equally spaced rounded slots or indentations 84, each of which receives one of the equal number of studs or pins 86 that are fixedly secured to the pinion 42.

The notches or slots 84 are disposed to be concentrically oriented about the axis 37 of the shaft 22, while the pins or studs 86 are oriented to be concentric about the axis of the pinion 42 which in turn is concentric about the eccentric axis 88 of the sleeve eccentric portion 43.

The threading 46 that connects the operating shaft 22 and the eccentric sleeve 44 comprises internal threading 90 (see FIG. 2) of the sleeve and external threading 92 of the shaft having a hand such that when the brake chain 28 is under tension, the sleeve 44 will tend to turn in the direction of the shaft clutch collar 54 whereby the clutch device 51 operates to frictionally clamp the ratchet wheel 56 in operating engagement with the shaft 22.

Suitable needle bearings 94 are shown applied between the operating shaft and sleeve 44, while suitable needle bearings 96 are shown applied between the pinion 42 and the collar 44; it is to be understood, of course, that these are illustrative only of the types of bearings that may be employed between the parts indicated as suitable plane bearings or other types of anti-friction bearings may be employed as found to be necessary or desirable for particular applications.

For the limited wind hand brake 10 shown in FIGS. 1–7, the attaching plate 16 has suitably affixed to its inner surface 98 a stop lug 100 (see FIG. 6) which is engaged by a radial flange 102 (see FIGS. 2A and 6) defined by the drum base plate 38 on its rearwardly facing side 104. The lug 100 thus projects forwardly of the rear edge 105 of the flange 102 of the drum base plate 38 (see FIG. 2A) to serve as a stop for limiting the unwinding motion of the drum when the brake is released, as well as limiting wind up motion of the drum.

The hand brake 10 is preferably proportioned and arranged for 26 to 28 inches of chain brake wind up which may be accomplished in approximately 315° of rotational movement of the brake drum clockwise of the position of FIG. 6.

Figure 3:
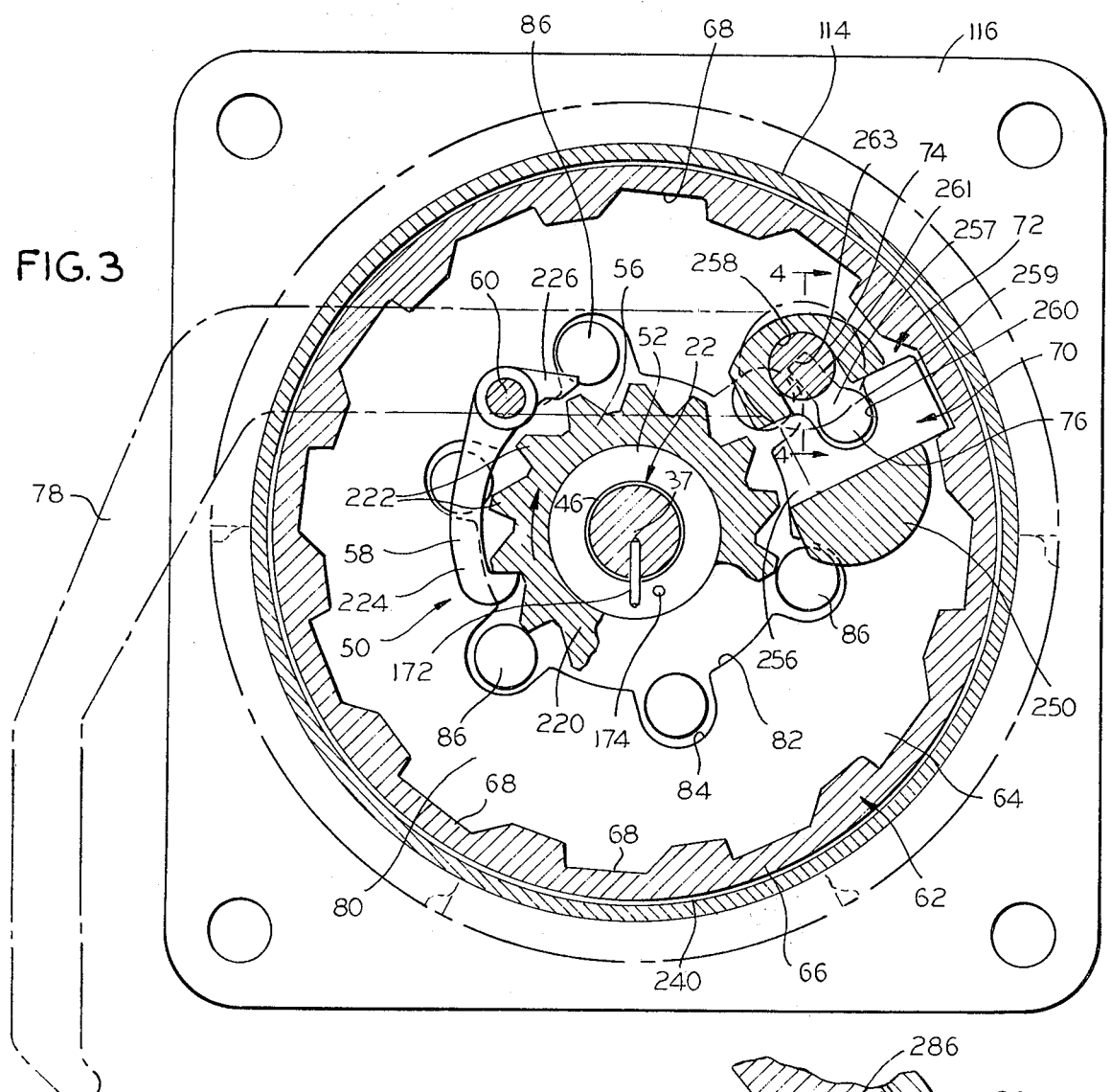
FIG. 3 is a diagrammatic vertical sectional view taken substantially along line 3—3 of FIG. 2, with parts broken away and the release lever shown in broken lines.
Figure 4:
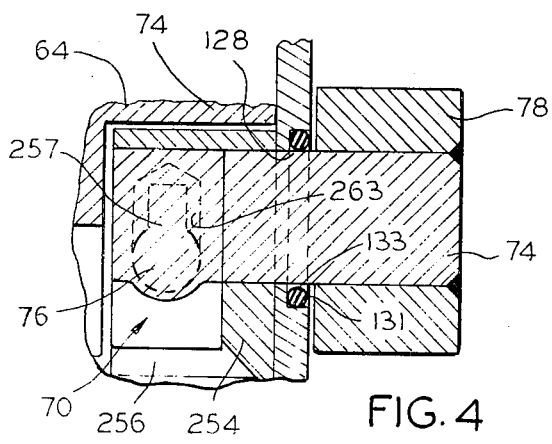
FIG. 4 is a fragmental sectional view taken substantially along line 4—4 of FIG. 1.

Assuming the brake device 10 is mounted in its operating position, the brake chain 28 is suitably connected to the brake rigging in the usual manner, and release pawl 70 is seated in a release wheel notch 68, the chain 28 is wound to set the car brakes by the operator grasping the hand wheel 24 and rotating it clockwise of FIGS. 1, 3 and 6. The tension on the chain 28 biases sleeve 44 relative to the operating shaft 22 to clamp the ratchet wheel 56 in firm cooperating relation with the shaft 22 whereby as the shaft 22 is rotated, the ratchet wheel 56 moves clockwise of FIGS. 1, 3 and 6, and pawl 58 operates in the usual manner to accommodate the ratchet movement in a clockwise direction, but precluding movement in the opposite direction.

Rotational movement of the shaft 22 in a clockwise direction also effects corresponding rotation of collar 44 therewith which cams the pinion 42 to gyrate relative to the shaft 22 in such a manner that the portion of the pinion gearing which meshes with the gearing of the ring gear 40 revolves about the shaft 22 to effect the chain winding movement of the drum 26.

In one specific form of the invention illustrated in FIGS. 1–7, the pinion is provided with 38 teeth and the ring gear is provided with 39 teeth, which provides a full power brake mechanism that winds the chain from the left to the right of FIGS. 1, 3 and 6 in applying the brakes.

The brake wind up continues until the brakes are fully applied, with the engagement of the pawl 58 with the ratchet wheel 56 precluding release of the brakes after brake setting has been completed. Pawl 58, of course, holds the ratchet wheel against release in all positions of pawl 58 relative to the ratchet wheel 56.

During the brake setting operation, the release wheel 62 is keyed to the housing 12 through release pawl 70, and thus serves as a purchase against which the pinion pins 86 operate, as is necessary for torque application to the winding drum. In operation, the pins 86 follow circular paths within their respective notches or slots 84, with at least one of the pins 86 being in engagement with the release wheel flange or side wall 80 at all times.

When controlled release of the brake is desired, the operator moves the hand wheel 24 counterclockwise of FIGS. 1, 3 and 6, which has the effect of turning the operating shaft 22 relative to collar 44 at threading 46 so as to sufficiently loosen the clutch device 51 that some payout of the brake chain 28 is permitted under the tension acting on same. The tension on the brake chain 28 tends to return the collar 44 into full clamping relation with the ratchet wheel 56 so that if counterclockwise movement of the hand wheel 24 ceases, the clutch device 51 is automatically operated to set the brake against further release of the brake chain. The operator can thus effect gradual brake release by continuing counterclockwise movement of the hand wheel at the speed at which he wishes to effect the gradual brake release.

When it is desired to provide a free or full release to the brakes, the release handle 78 is grasped and moved upwardly of FIGS. 1 and 3 to withdraw the release pawl 70 from a cooperating notch 68 of the release wheel 64. As the tension on the brake chain 28 is resisted through the brake drum and its ring gear 40, pinion 42, and the pinion pins 86 reacting against the flange or end wall 80 of the release wheel 64, the drum and release wheel freely turn as the brake chain 28 pays out from the hand brake under the tension acting on same, with the drum 26, pinion 42, and the release wheel 64 rotating freely about the shaft 22 and its collar 44. The clutch device 51 and ratchet mechanism 50 remain unaffected by the brake release, except, of course, the operating shaft is free of torque applied to same as a result of tension acting on the brake chain.

In the embodiment of FIG. 7, the hand brake 10A is essentially the same as hand brake 10 except that the hand brake is arranged for continuous wind operation wherein the brake chain end 30 extends through the hand brake for anchoring to some part of the car exterior of the hand brake, to provide the desirable stoppage of brake release movement. In this embodiment, the brake drum 26 may be revolved in excess of 360° as may be necessary or desirable, and for this purpose either the lug 100 is omitted from the back plate 16 or the flange 102 is omitted from the drum to permit the indicated rotational movement of the drum in excess of 360°.

SPECIFIC DESCRIPTION

The front casing 14 is of dished configuration defining a forward wall 100 of generally planar configuration that is integral with a rounded side wall 112 in which the release wheel is journaled, which wall 112 is flared outwardly as at 114 to accommodate the winding drum 26 with the chain 28 wound on same (see FIG. 2), and merges into integral planar side flange 116 that is of the same quadrilateral configuration as the attaching plate 16 and defines the bolt openings 18 in its corners 20 that are aligned with the corresponding openings and corners 19 and 21 of the back plate 16 for securement of these components together and to base plate 23.

The front casing on either side of same (see FIGS. 1, 3 and 6) is formed with chain accommodating openings 122 and 124. The front casing wall 110 is also formed with central opening 126 in which the bearing 36 is mounted (and suitably secured in place, as by welding at 127), as well as opening 128 (see FIG. 4) which receives the release shaft 74, and opening 130 (see FIG. 1) in which the pawl journaling pin 60 is suitably secured. The front casing opening 128 has recess 131 formed thereabout to receive annular seal 133 that is in sealing engagement with release shaft 74.

The back plate 16 in addition to being formed with bolt receiving openings 19 is formed with circumferentially spaced indentations 133 for strengthening purposes.

The bearing sleeve 34 is formed to define a circumambient side wall 134 forming a bore 136 in which the inner end 138 of the shaft 22 is received for journaling purposes. The sleeve 34 also includes laterally extending side flange 140 that is applied against the inner surface 98 of the back plate 16, it being welded thereto as at 142 in the form shown. Sleeve 34 is seated against central planar portion 143 of back plate 16.

The operating shaft 22 at its outer end 144 is threaded for application thereto of securing nut 146 that bears against lock washer 148 and the hub 150 of the hand wheel 24 of the purpose of mounting the hand wheel in operating position. The operating shaft is formed with polygonal portion 152 (of square section in the form illustrated, see FIG. 1) with which the bore 154 of the hand wheel hub 150 makes a complementary fit, as is conventional with devices of this type.

The operating shaft 22 further includes an enlarged cylindrical portion 156 which is journaled in the bearing 36, the latter being provided with a groove 158 (see FIG. 2) that receives suitable seal 160 for sealing purposes.

The clutch flange portion 54 of the shaft 22 is interposed between its threaded portion 161 (which bears external threading 92) and its cylindrical portion 156 and defines frustoconical friction clutch surface 162 that is adapted for cooperation with the ratchet wheel 56.

The sleeve 44 in addition to its eccentric portion 43 defines flange portion 164 that is formed with frustoconical friction surface 166 that opposes the operating shaft surface 162 for cooperation with the ratchet wheel 56. The sleeve eccentric portion 43 defines a cylindrical cam surface 168 that is struck about the eccentric axis 88 (see FIG. 6).

The needle bearings 94 and 96 are only diagrammatically illustrated and in practice comprise roller bearing assemblies of any conventional type where this type of antifriction bearing is employed.

It will be noted from the showing of FIG. 2 that within the ratchet wheel 56, and between the shaft flange portion 54 and the eccentric sleeve flange portion 52 an annular working space 170 is defined. In accordance with this invention, the shaft 22 is provided with a radial pin 172 which projects into the space 170, and the sleeve is provided with an axially extending pin 174 which likewise extends into the space 170 and into the path of movement of the shaft pin 172.

The pins 172 and 174 function to limit the amount that the sleeve 44 can move axially of the shaft 22.

These pins have the relative positioning indicated in FIG. 3 when the hand brake is in released condition. When the shaft 22 is operated to wind the brake chain, its positioning relative to the sleeve 44 remains the same as the tension on the brake chain tends to bias the sleeve 44 to turn against the ratchet wheel 56 and thus maintain the relative positioning indicated in FIG. 3.

The relative positioning of the pins 172 and 174 also does not change on full release since the operating shaft 22 and sleeve 44 do not move on full release.

However, for controlled release, the hand wheel 24 and shaft 22 are moved such as to tend to shift the sleeve 44 to the left of FIG. 2, relative to shaft 22, to permit chain unwinding movement under the tension on the chain.

While some movement of the sleeve axially of the shaft 22, due to the threading action that is involved, is necessary to free the shaft 22 and sleeve 44 from the ratchet wheel for the unwinding movement that is desired for controlled release of the brake, it is preferable that this threading movement of the sleeve be limited to avoid having the sleeve 44 engage the bearing drum plate 38 with sufficient force to result in expansion forces being applied to the insides of the front casing 14 and back plate 16. For this purpose, the shaft radial pin 172 engages the sleeve pin 174 after rotational movement of the shaft 22 sufficient to release the clutch device 51 so that thereafter the sleeve 44 will move with the shaft 22. Ceasing of the unwinding movement of the shaft 22 by the operator will result in the sleeve 44 being retightened against the ratchet wheel 56 by the tension acting on the brake chain biasing the sleeve to turn itself against the ratchet wheel to make the clutch device 51 effective.

The pinion is in the form of an annular disc member 180 defining a bore 182, that is journaled on the eccentric sleeve portion 43, and a rim portion 184 formed to define the pinion teeth 186. The pitch diameter of the teeth 186 and the bore 182 are concentric with the axis 88.

The studs or pins 86 are suitably affixed in the corresponding openings 188 formed in the disc member 180 to receive same, and as indicated in FIG. 2, the pins or studs 86 project sufficiently forwardly of the pinion 42 to be received in the release wheel notches 84.

The ring gear 40 is in the form of annular member 190 that is concentric with the operating shaft axis 37 and is formed about its inner margin 192 with the gear teeth 194 that mesh with the gear teeth 186 of the pinion 42 in the eccentric manner indicated in FIG. 6. The pitch diameter of the teeth 194 is, of course, concentric with the axis 37, while the pitch diameter of the pinion teeth 186 is concentric with the axis 88.

The drum base plate 38 is in the form of dished member 200 defining a planar base wall 202 having an arced rim wall 204 which merges into the laterally directed planar flange portion 206 at the rim 207 of same and into a hub portion 209 centrally of same that is received within sleeve 34 in journaling relation thereto, and which receives the inner end 32 of shaft 22 in journaling relation thereto. The members 190 and 200 are fixed together with the member 190 abutting the member 200 base wall 202, as by welding at 208, whereby the members 190 and 200 are spaced apart about their marginal edges to define a marginal recess 210 that receives alternate links of the chain 28. In the embodiments shown, the members 190 and 200 are formed with identical radial projections 212 and 214 that are aligned axially of the device, which receive the chain links that are alternate to those which are received in the recess 210. The projections or lugs 212 and 214 may, however, be omitted in the limited wind embodiment of FIGS. 1–6. Wall 134 of sleeve 34 includes groove 217 that receives seal 219 that is in sealing relation with the hub portion 209 of base plate 38.

The ratchet device 50 comprises the ratchet wheel 56 that is in the form of annular member 220 formed with suitable ratchet teeth 222 for cooperation with the double ended pawl 58 that operates in the manner provided by conventional silent ratchets having double ended pawls of which the ratchet wheel 56 and pawl 58 are intended to illustrate. Thus, the pawl 58 includes arms 224 and 226 that are shaped to engage the teeth 222 of the ratchet wheel 56 in such a manner as to maintain continuous hold on the ratchet wheel preventing movement counterclockwise of FIG. 3 while permitting movement clockwise of FIG. 3. This type of ratchet arrangement avoids the need for any biasing spring acting on the pawl 58.

The ratchet wheel 56 is annular in nature and is formed to define the respective friction clutch surfaces 228 and 230 that are respectively engaged by the operating shaft clutch surface 162 and the eccentric sleeve clutch surface 166. The ratchet wheel 56 also defines cylindrical internal surface 232 that closes off the operating space 170 in which the cross pins 172 and 174 are disposed.

The release wheel 64 has its rim wall 66 formed to define cylindrical surface 240 that substantially complements the cylindrical portion 112 of the front casing 14. The spider 64 that forms the release wheel is grooved thereabout at 242 to receive suitable seal 244 for sealing off the spider about the rim wall 66. The spider flange 80 is formed with circular groove 246 thereabout that receives suitable seal 248 which provides for sealing between the drum ring gear 40 and the release wheel. Seal 244 is in frictional engagement with front casing wall 112 and serves as an energy absorber on release of the release wheel 62, as well as a sealing function.

The brake release 72 involves the release pawl 70 which is slidably mounted in a bracket member 250 that is suitably affixed to the front casing 14, as by welding at 252 (see FIG. 2), and is suitably formed to define rectilinear slideway 256 in which the pawl 70 is slidably mounted for movement radially of the operating shaft 22. The bracket member 250 is also suitably formed as at 258 to receive the release shaft 74. The pawl 70 is suitably recessed as at 260 to pivotally receive the release shaft crank arm or lever 76, which, in the form shown, comprises a ball stud 257 having its ball 259 seated in pawl recess 260 and its shank 261 lodged in socket 263 formed in release shaft 74.

As indicated in FIG. 2, the release pawl 70 and the ratchet wheel 56 are in coplanar relation and these parts are positioned so that the ratchet wheel 56 serves as a stop for limiting movement of the pawl 70 in the direction of the operating shaft 22, which thus limits the upward release movement of the release arm 78, so that when arm 78 is released by the operator, it is gravity biased to urge pawl 70 radially outwardly for engagement with the release wheel notches 68.

Figure 5:
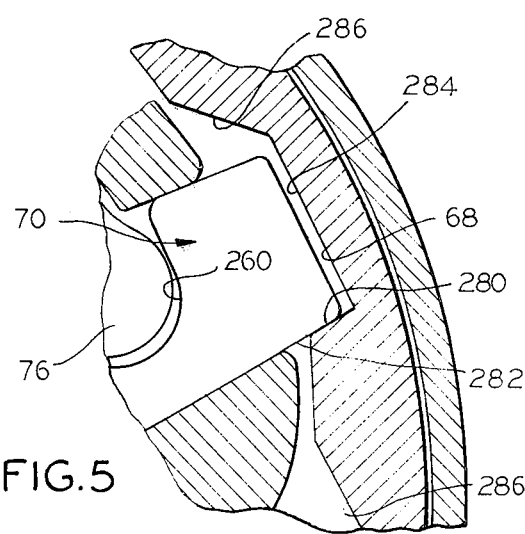
FIG. 5 is a fragmental view similar to that of FIG. 3 with reference to the release wheel and its lock device, but on a slightly enlarged scale and showing the cooperation between the two.

As indicatd in FIG. 5, the notches 68 of the release wheel 62 are of special configuration in that the end surface 280 of the respective notches 68 that engages the undersurface 282 of the pawl 70, when the pawl 70 is in its locking relation with the release wheel, is shaped to have an obtuse angle relative to the planar base wall 284 of the notch 68. This results in a force application to the pawl 70, due to the biasing action applied to the release wheel by the tension on the brake shank, which introduces a force component on the pawl tending to aid in shifting the pawl 70 outwardly of the notch 68 in which it is received, on lifting of release handle 78. The wall 280 should have an angulation of approximately 95° to 100° relative to the notch base wall 68 for this purpose.

In addition, the side wall 286 of the individual notches that opposes side wall 280 is also at an obtuse angle with respect to notch base wall 284 of greater angulation than wall 280, approximately 135 degrees in the illustrated embodiment. This shaping of the individual notches 68 provides protection against rotation of handle wheel 24 in the wrong direction when the brake chain 28 is to be wound up. If the hand wheel 24 is turned counterclockwise (of FIG. 3) when chain 28 is released, the release wheel 62 will tend to rotate in a clockwise direction, with notch wall 286 camming pawl 70 to the right of FIG. 3 so that pawl 70 will snap into the next succeeding notch 68 of wheel 62. This, of course, effects a bobbing action on release lever 78 which warns the operator he is turning the hand wheel 24 in the wrong direction. For chain wind up, however, the action of gravity on the release handle 78, and the relatively flat obtuse angle of notch wall 280, in bearing against pawl 70 when the hand wheel is rotated correctly for chain wind up, insures that pawl remains in the keyed relation to wheel 62 that is required for chain wind up purposes.

The release handle 78 may be of any suitable type, with the bottom release configuration illustrated being preferred for the embodiments of the invention shown in FIGS. 1–7. Handle 78 is suitably keyed to release shaft 74.

In the limited wind embodiment of FIGS. 1–6, the end link 290 of the chain 28 and 30 is suitably affixed to a winding drum 12, as by applying same to suitable pin 292 that is suitably affixed to the drum 26. When the chain 28 is thus wound up on the drum 26, the chain end 30 thus moves over the top of the drum as the drum is moved clockwise of FIGS. 1, 3 and 6, under the general arrangement that has been described with reference to FIGS. 1–6. On quick release, the chain end 30 moves in the opposite direction until the drum flange 102 engages the stop lug 100.

In the form shown in FIG. 7, the chain end 30 extends across the top of the winding drum and out the second housing opening 124 for securement to the car where indicated at 294, which securement may include a suitable cushioning spring arrangement diagrammatically illustrated at 298. For this purpose, chain end 30 is shown secured to suitable eye bolt 300 which passes through bracket plate 302 that is suitably affixed to the car (not shown). Bolt 300 carries spring seat 304 between which and the plate 302 is applied compression spring 306 to form the cushioning arrangement 298 that is diagrammatically illustrated, for purposes of illustration.

It will thus be seen that the invention provides a hand brake arrangement that is compact in assembly, effective in operation and flexible as to application.

The general concentric arrangement of the winding drum and operating shaft provides a unit of compact size and arrangement.

The teeth arrangement of the ring gear 40 and pinion 42 may be varied to suit various purposes. For instance, a full power unit is provided with the pinion having 38 teeth and the ring gear having 39 teeth, while providing an embodiment where the pull on the chain is from the left hand side of the unit as viewed from the front side of same (FIGS. 1, 3 and 6). By changing the ring gear teeth to 40, the device becomes a one-half power unit.

The designer has the alternate of making the teeth on the pinion greater in number than the teeth of the ring gear, which will result in the pull on the brake chain being from the right hand side of the unit as viewed in FIGS. 1, 3 and 6. Thus, by providing the pinion 42 with 39 teeth and the ring gear with 38 teeth, the device is a high power unit with chain pull from the right of same (viewed as indicated), in which case, the chain end that is anchored to the car is at the left hand side of the form of FIG. 7. By providing the pinion 42 with 40 teeth meshing with 38 teeth for the ring gear, a half power unit of the right hand chain pull type is provided.

The seals that are employed in connection with the release wheel as well as at the release shaft 74 and bearing 36 result in the gear device 48, the clutch device 51, and the ratchet device 50 being enclosed in a sealed area that may be suitably lubricated.

As indicated, the device is readily adapted for either the limited or continuous wind type application, with the same basic car parts being provided for each, with the exception that for the continuous wind application, either the stop lug 100 or the drum stop flange 102 should be omitted.

It will be apparent, of course, that the gearing arrangement of the ring gear and pinion may be made to meet the needs of the particular application for which the gear is to be applied. However, for railroad car use, the tooth arrangement that has been indicated is preferred.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. A hand brake for railroad cars comprising:
    a housing adapted to be mounted on a railroad car,
    an operating shaft journaled in said housing for rotation about an axis extending longitudinally of said shaft,
    a sleeve mounted on said shaft and coupled thereto for rotational movement therewith,
    said sleeve having a cam portion that is in eccentric relation to said axis,
    a winding drum journaled in said housing for rotational movement about said axis and having a brake chain coupled thereto for being wound thereby,
    said winding drum including a ring gear portion,
    a pinion journaled on said sleeve cam portion and meshing with said ring gear, in eccentric relation thereto, for rotating said drum about said axis,
    a release wheel journaled in said housing for rotation relative to said housing about said axis,
    means for releasably keying said wheel against said rotation thereof,
    means for keying said pinion to said wheel for rotation therewith including means for accommodating gyration of said pinion relative to said ring gear and said wheel on rotation of said shaft and said sleeve relative thereto whereby when said wheel is keyed against said rotation of same relative to said housing rotation of said shaft and said sleeve about said axis effects rotation of said drum relative to said housing, ratchet means acting between said shaft and said housing for accommodating rotation of said shaft in one direction to wind said chain and opposing rotation of said shaft in the opposite direction, releasable clutch means acting between said shaft and said ratchet means for releasably clutching said shaft to said ratchet means under the tension in said chain to maintain said shaft against rotational movement in said opposite direction, means for releasing said clutch means on hand rotation of said shaft in said opposite direction, for accommodating controlled release of the brake by limited rotation of said drum under the tension on said brake chain, and means for releasing said release wheel keying means whereby said release wheel and said winding drum rotate relative to said shaft and sleeve to effect quick release of the brake.

2. The hand brake set forth in claim 1 wherein:
said ratchet means comprises:
a ratchet wheel, received about said shaft, and a double ended pawl pivotally connected to said housing and having its ends cooperating with said ratchet wheel in ratchet catch and release manner,
said clutch means comprising:
said shaft and sleeve having opposing clutch collar portions disposed one on either side of said ratchet wheel,
said ratchet wheel defining oppositely disposed clutch surfaces positioned for engagement by said clutch collar portions respectively,
and means for moving one of said clutch portions axially of said shaft, on hand movement of said shaft in said opposite direction, for unclutching said shaft relative to said ratchet wheel for accommodating said controlled release of the brake, and comprising said means for releasing said clutch means.

3. The hand brake set forth in claim 2 wherein:
said moving means comprises said sleeve being threadedly connected to said shaft by threading having a hand such that tension acting on said chain clutches said clutch collar portions in clutching relation to said ratchet wheel.

4. The hand brake set forth in claim 1 wherein:
said release wheel comprises:
a spider formed internally to define a radial flange in circumambient relation about said shaft,
said means for keying said pinion to said wheel comprising:
said spider flange being formed with spaced openings thereabout,
said pinion having fixed to same studs extending parallel to said shaft and spaced to be received in the respective openings of said spider flange with lost motion connection therewith to accommodate said gyration of said pinion.

5. The hand brake set forth in claim 4 wherein:
said spider is further formed to define inwardly directed teeth,
and including a release pawl mounted in said housing for movement into and out of said teeth and comprising said means for releasably keying said wheel against said rotation thereof,
and means for moving said release pawl into and out of said teeth.

6. The hand brake set forth in claim 5 wherein:
said spider teeth, said release pawl, and said ratchet means are in substantial coplanar relation,
said release pawl being mounted in said housing to act radially of said shaft,
said release pawl being interposed between said spider teeth and said ratchet means,
said ratchet means serving as a stop to limit radially inward movement of said release pawl on movement of same to release said release wheel.

7. The hand wheel set forth in claim 3 wherein:
said shaft and said sleeve include cross pin interengaging means for limiting threading movement of said sleeve relative to said shaft on hand rotation of said shaft in said opposite direction to effect controlled release of the brake.

8. The hand wheel set forth in claim 1 wherein:
said brake chain has one end of same pinned to said drum whereby said hand wheel is of the limited wind type,
and including stop means for limiting wind up of said chain on said drum.

9. The hand brake set forth in claim 1 wherein:
said chain and said drum are in meshing relation with both ends of said chain projecting from said housing, whereby said hand brake is of the continuous wind type.

10. The hand brake set forth in claim 6 wherein said means for moving said release pawl comprises:
a release handle coupled to said pawl and gravity biased to bias said pawl into said spider teeth.

11. The hand brake set forth in claim 10 wherein:
said spider teeth are formed to apply a component of force acting on said pawl tending to bias same in the direction of said ratchet means,
said component of force being less than the biasing action of said release handle on said pawl.

12. In a hand brake for railroad cars that includes a housing adapted to be mounted on a car, an operating shaft journaled in said housing for rotation about an axis that extends longitudinally of said shaft, a winding drum rotatably journaled in said housing and having a brake chain coupled thereto for being wound thereby, and means for rotating said drum by rotating said shaft, the improvement wherein:
said drum is disposed in concentric relation about said shaft and includes a ring gear portion,
and including:
a sleeve mounted on said shaft and coupled thereto for rotational movement therewith,
said sleeve having a cam portion that is in eccentric relation to said axis,
a pinion journaled on said sleeve cam portion and meshing with said ring gear, in eccentric relation thereto, for rotating said drum about said axis,
a release wheel journaled in said housing for rotation relative to said housing about said axis,
means for releasably keying said wheel against said rotation thereof,
means for keying said pinion to said wheel for rotation therewith including means for accommodating gyration of said pinion relative to said ring gear on rotation of said shaft and said sleeve relative thereto whereby when said wheel is keyed against said rotation of same relative to said housing, rotation of said shaft and said sleeve about said axis effects rotation of said drum relative to said housing, ratchet means acting between said shaft and said housing for accommodating rotation of said shaft in one direction to wind said chain and opposing rotation of said shaft in the opposite direction, releasable clutch means acting between said shaft and said ratchet means for releasably clutching said shaft to said ratchet means under the tension in said chain to maintain said shaft against rotational movement in said opposite direction, means for releasing said clutch means on hand rotation of said shaft in said opposite direction, for accommodating controlled release of the brake by limited rotation of said drum under the tension on said brake chain, and means for releasing said release wheel keying means whereby said release wheel and said winding drum rotate relative to said shaft and sleeve to effect quick release of the brake.

13. The improvement set forth in claim 12 wherein:

said shaft at one end of same projects outwardly of said housing and has keyed to same handle means for rotating said shaft and comprising said rotating means, said shaft at the other end of same being within said housing, said shaft other end and said drum being journaled within said housing by common journaling means.

14. The improvement set forth in claim 13 wherein:

said means for releasing said release wheel keying means comprises a gravity biased lever mounted externally of the housing and biasing said release wheel keying against release, and means for moving said lever in response to movement of said release wheel when said shaft is rotated in the wrong direction when winding up the chain to provide a visible warning of such direction to the operator.

* * * * *